April 21, 1925.
H. A. WEIHMANN
TEMPLATE FILLING MACHINE
Filed Feb. 13, 1922    5 Sheets-Sheet 3
1,534,338
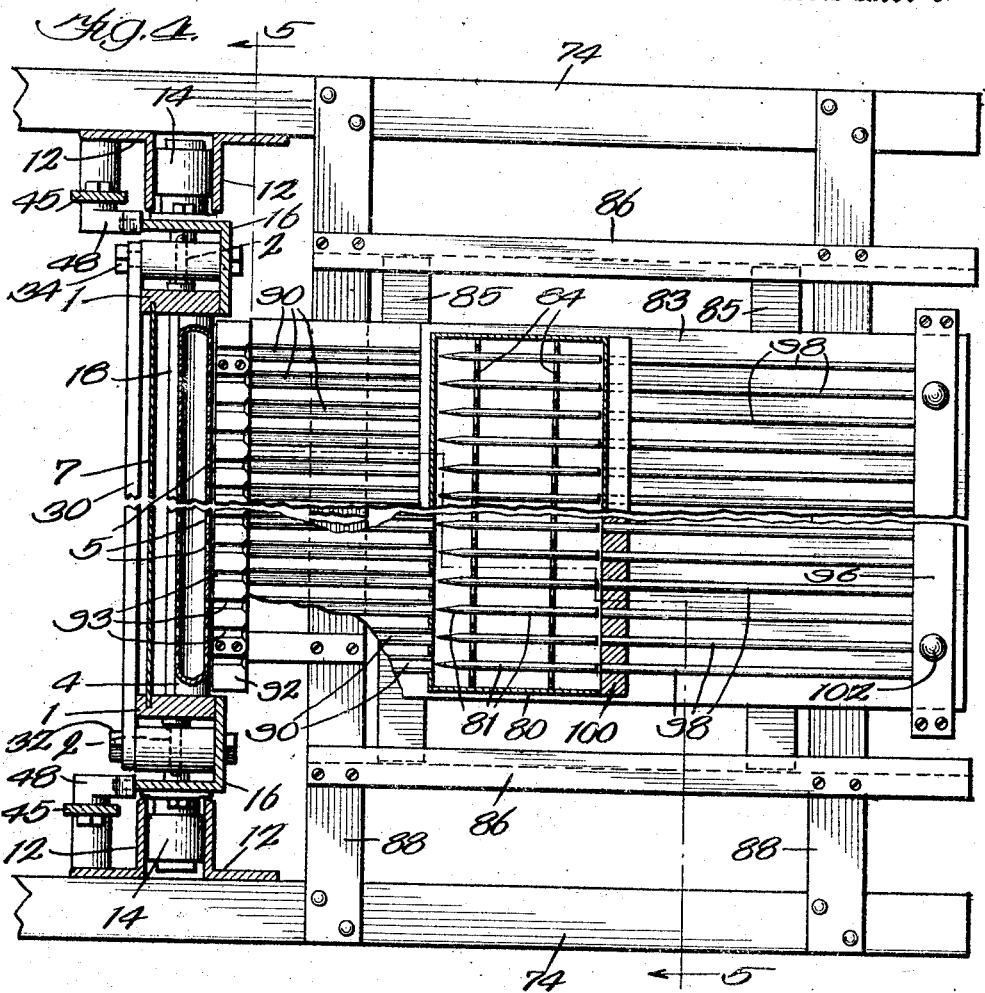
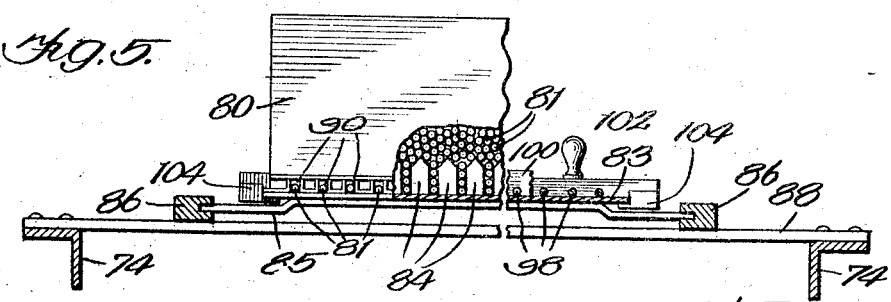
Inventor:
Henry A. Weihmann
By Cheever & Cox Attys.

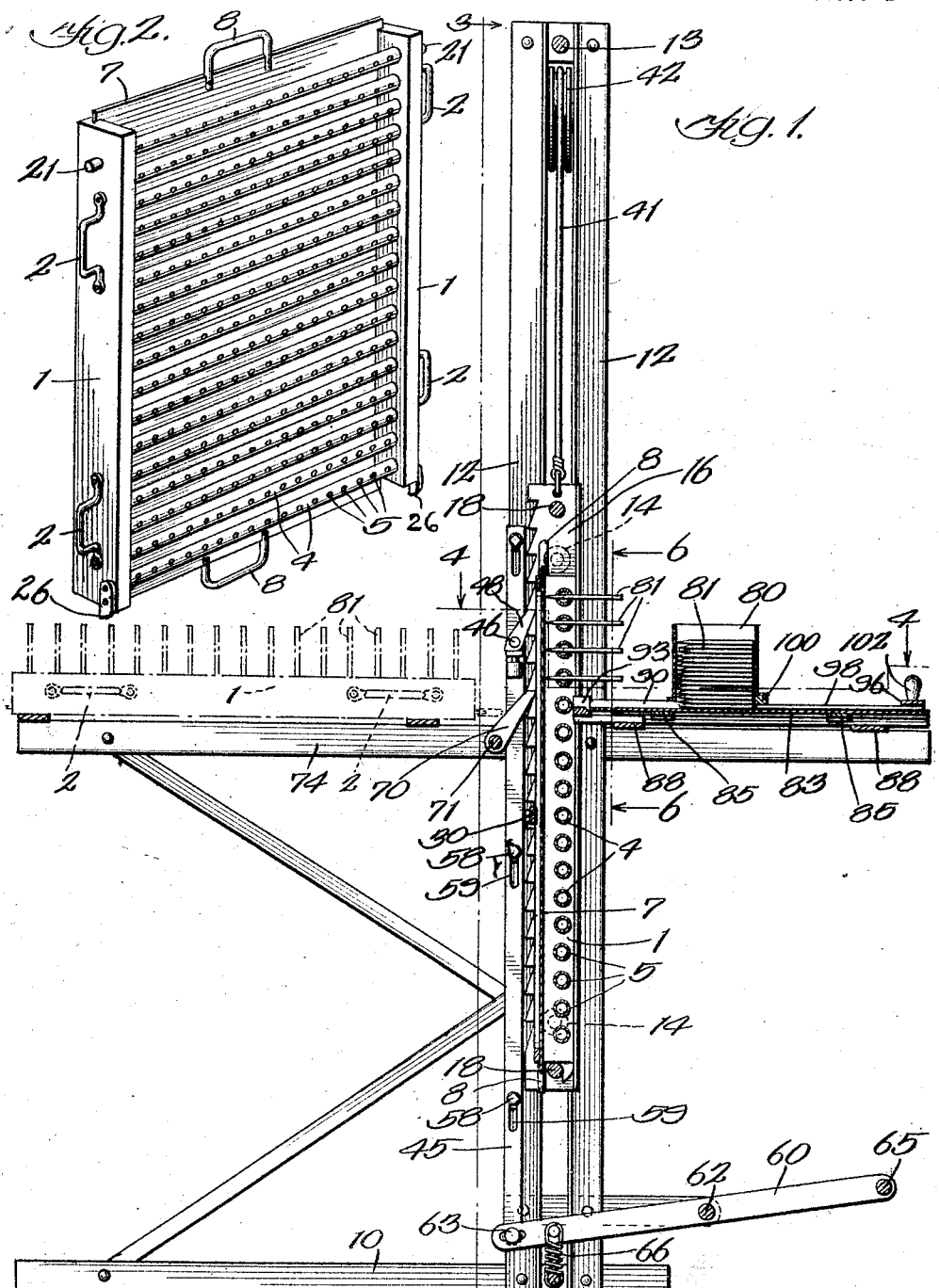

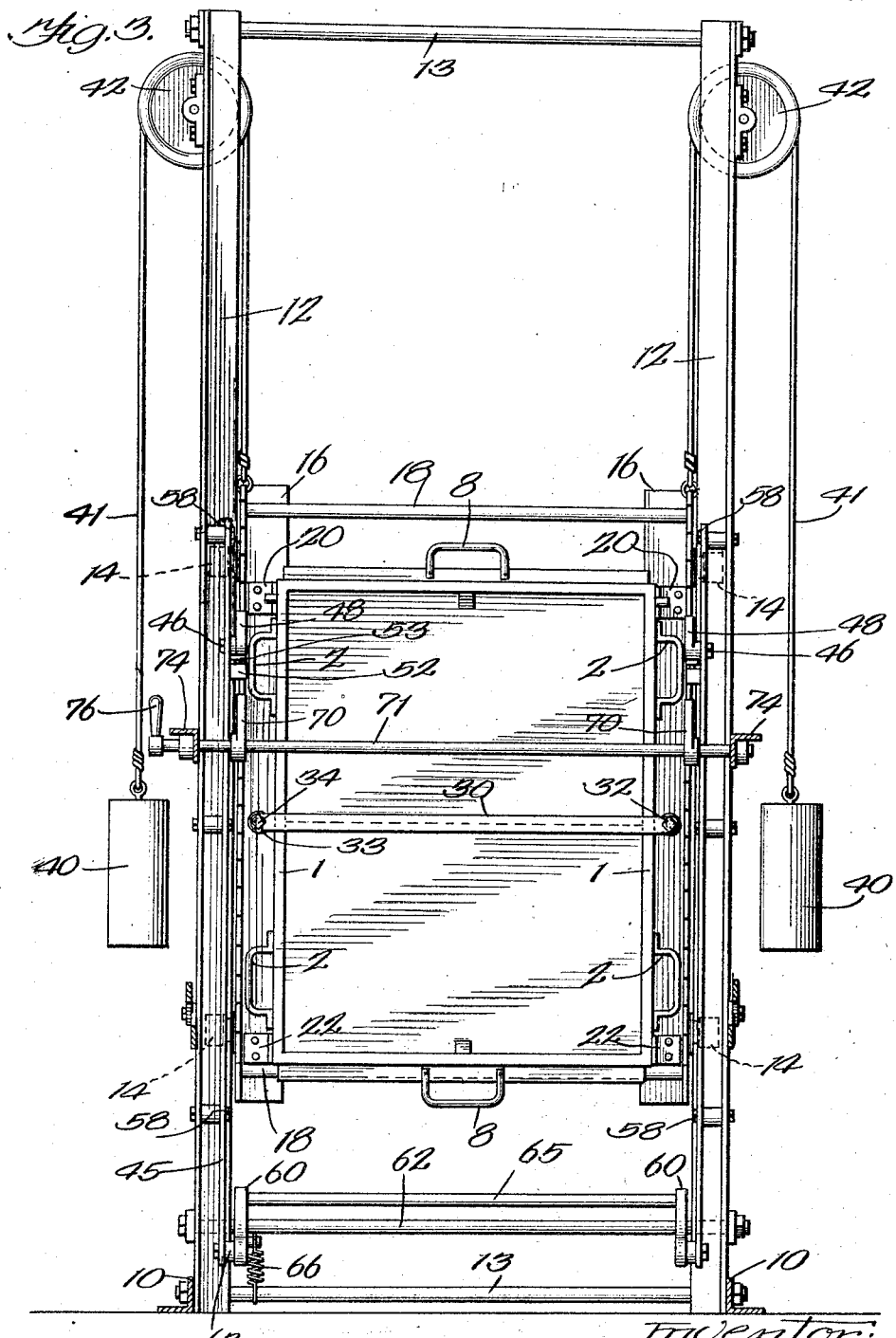

April 21, 1925.  
H. A. WEIHMANN  
TEMPLATE FILLING MACHINE  
Filed Feb. 13, 1922  
1,534,338  
5 Sheets-Sheet 4

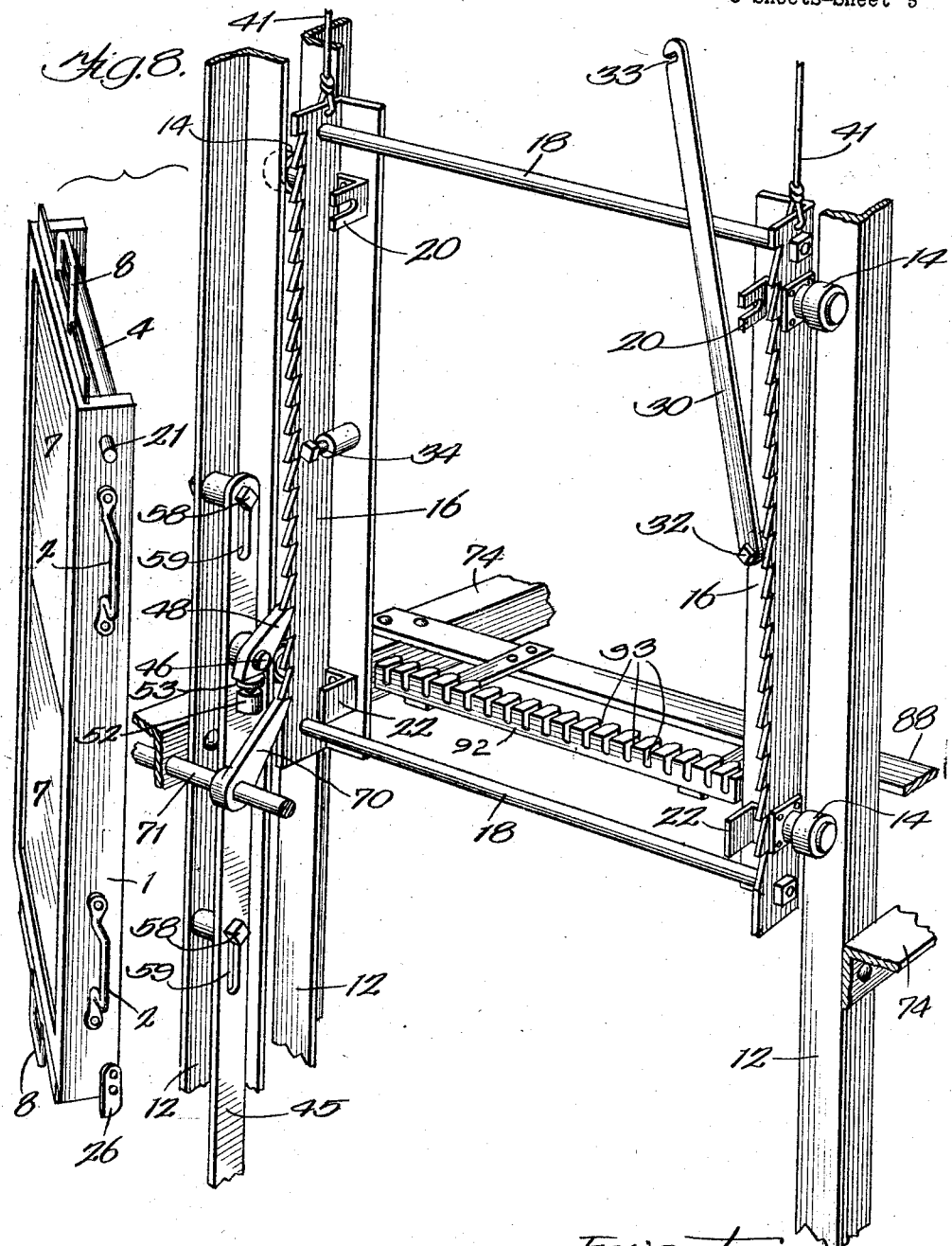

Patented Apr. 21, 1925.

1,534,338

UNITED STATES PATENT OFFICE.

HENRY A. WEIHMANN, OF CHICAGO, ILLINOIS, ASSIGNOR TO BUNTE BROTHERS, OF CHICAGO, ILLINOIS, A CORPORATION OF ILLINOIS.

TEMPLATE-FILLING MACHINE.

Application filed February 13, 1922. Serial No. 535,974.

*To all whom it may concern:*

Be it known that I, HENRY A. WEIHMANN, a citizen of the United States, residing at Chicago, in the county of Cook and State of Illinois, have invented a certain new and useful Improvement in Template-Filling Machines, of which the following is a specification.

My invention relates to template filling machines, especially for use in connection with candy making. There is a well known type of candy, known in the trade as "suckers," in which a piece of hard candy is provided with a skewer or handle, usually of wood, by which the child can hold the candy while sucking it. In quantity production, it is customary to mould a large number of these pieces at a time in a multi-cell mould in the form of a rectangle frequently containing several hundred individual moulds or cells. The skewers are held in place while the hot, molten candy is being poured and is cooling, by means of a skewer holder or "template." The template holds the skewers in central position in the cells of the mould until the candy becomes hard, after which the template is lifted off, the skewers remaining firmly embedded in and projecting from the individual pieces of candy. The object of my invention is to provide a machine by which these skewers may be rapidly inserted into the templates.

I accomplish my objects by the mechanism illustrated in the accompanying drawings, in which—

Figure 1 is an elevation of a machine, chiefly in central vertical section.

Figure 2 is a perspective view of the empty template.

Figure 3 is a rear elevation of the machine.

Figure 4 is a plan section of the line 4—4, Figure 1.

Figure 5 is a vertical section on the line 5—5, Figure 4.

Figure 8 is a perspective view of the machine partially stripped to better illustrate the operation of the template and template holder. At the left of the figure the template is shown as if it were approaching the machine to be inserted thereinto.

Like numerals denote like parts thruout the several views.

Figure 6:
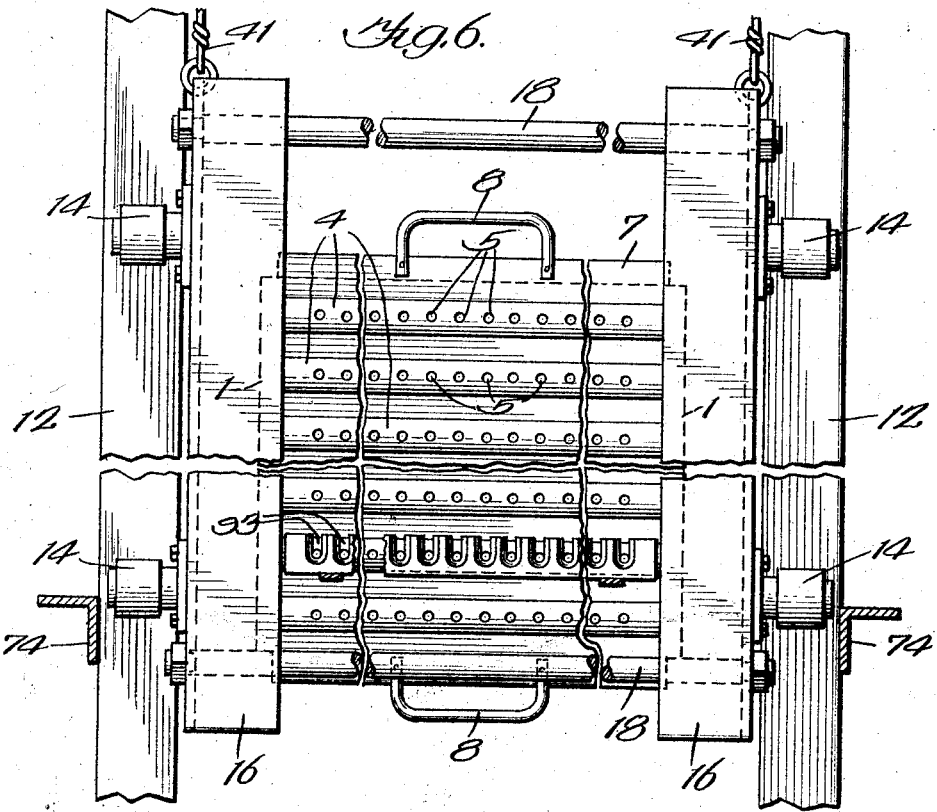
Figure 6 is a vertical section on the line 6—6, Figure 1. The parts are partially broken away to make it possible to show the parts on a larger scale.

In order to make the machine more readily understandable, I will first describe the template, which is to be supplied to skewers. This is shown in perspective in Figure 2 and at the left portion of Figure 8. It consists of a frame having side members 1 provided with handles 2 by which it may be manipulated. Extending crosswise between the frame members are cross rods 4 having a number of regularly spaced apertures 5 for holding the skewers. For the sake of lightness, it is desirable that these cross rods be tubular, altho they may be made solid without departing from the spirit of the invention. A plate 7 is slidingly mounted at the back or bottom of the frame, and serves as a temporary stop for limiting the distance to which the skewers may be inserted into the cross bars. It also forms means for supporting the skewers when the template is brought to horizontal position. In practice, when the template is placed over the mold, the plate 7 is withdrawn and the skewers descend into it. The plate is provided with handles 8 by which it may be manipulated.

Now to consider the charging machine itself: The main frame has a base 10 from which rise standards consisting, according to the present design, of four angle bars 12 arranged in pairs on opposite sides of the machine and braced by cross rods 13. The angle bars are spaced slightly apart to accommodate between them anti-friction rollers 14. These rollers are mounted upon the sides of the template-holder which, in the form illustrated, consists of two ratchet bars 16 rigidly fastened together by cross rods 18. The ratchet bars are formed from angle irons and are provided with bifurcated brackets 20 for receiving pins 21 projecting from the sides of the template. These brackets are located near the upper end of the template-holder. Near the lower end of the holder are spacing brackets 22 for holding the template braced against vibratory movement. When in place, the template rests upon the lower bar 18 of the template-holder. Lugs 26 project downward from the bottom of the template for engaging this bar 18 and cooperating with the brackets 22 to hold the template securely seated upon the bar. A locking bar 30 is pivoted to one side of the template-holder by a stud 32, and at the other end has a notch 33 adapted to fit over a stud 34 on the opposite side of the template-holder, as best shown in Fig. 8. This locking bar when in acting position as shown in Figure 3 backs up the template and holds it in the template-holder.

The weight of the template-holder and template is partially counterbalanced by weights 40 carried by cords 41 passing over sheaves 42 mounted near the upper end of the frame, as best shown in Fig. 3. The other end of each cord is fastened to the upper end of the template-holder, as best shown in Figures 1, 3, and 8.

Figure 7:
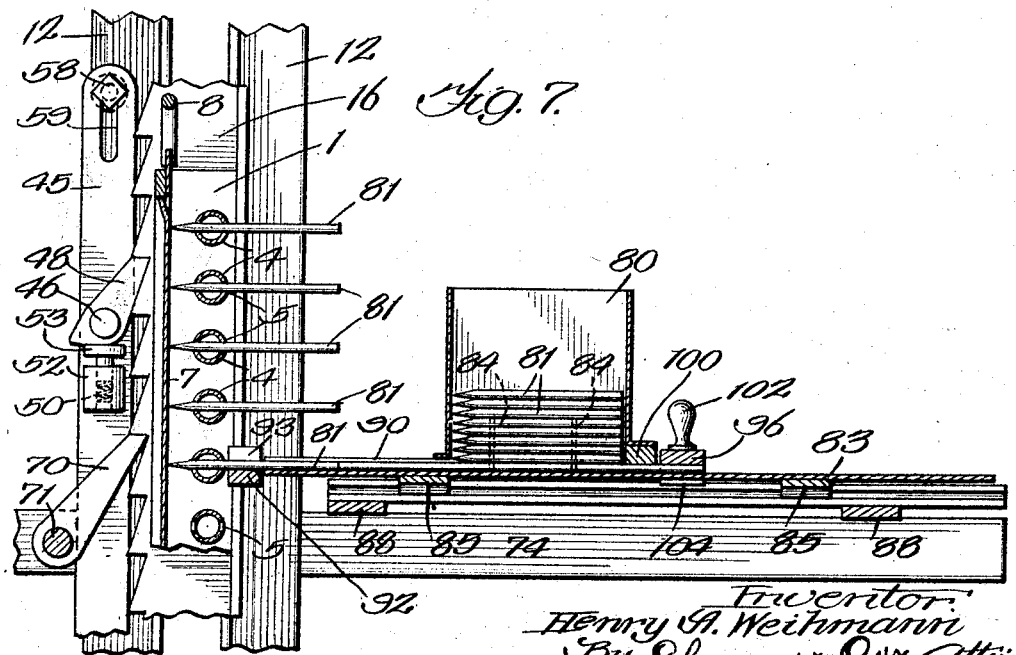
Figure 7 is a sectional view of the template holder, reciprocating charger, and associated parts. These parts are also shown in Figure 1 and are here shown on an increased scale.

It will be evident that the template when mounted in the machine stands in a vertical plane extending crosswise of the machine, the skewer-holding bars 4 running horizontally. During the charging operation, the template is shifted vertically as each skewer-holding bar is filled. According to the present design, the charging operation starts at the top of the template, and the template is raised step by step to bring a fresh bar into juxtaposition with the charger (presently to be described). This step by step elevation is accomplished in my machine by ratchet and pawl mechanism consisting of vertically reciprocating bars 45 having pins 46 which project horizontally inward and form pivots for ratchets 48, see especially Figures 7 and 8. The ratchets are yieldingly pressed toward the teeth on ratchet bars 16 by springs 50 mounted in chambered lugs 52 projecting inward from the bars 45, as shown in detail in Fig. 7. These springs support small plungers 53 which engage the tails of the ratchets and press them toward the teeth of the ratchet bars.

The bars 45 which carry the ratchets are guided by pins 58 which extend inward from the standards 12, and project thru vertical slots 59 formed in the bars 45. The ratchet carrying bars 45 are reciprocated vertically by a treadle consisting of levers 60 pivotally mounted upon a stationary fulcrum 62 and pivotally joined to the bars by pins 63, shown at the bottom of Figures 1 and 3. The levers are operated by a cross bar 65 and placed in a convenient location to be actuated by the foot of the operator. A spring 66 is provided for normally and yieldingly holding the bars 45 in lowered position. It will be evident that the raising and lowering of the foot bar 65 will cause a corresponding lowering and raising of the ratchets 48. The ratchets are effective only in the upward direction. The ratchet bars 16 are prevented from descending when the ratchets descend by pawls 70, which engage the ratchet teeth and are rigidly mounted on a rock shaft 71 journaled in horizontal frame members 74. This rock shaft is provided with a hand lever 76 shown at the left of Figure 3. By means of this hand lever the pawls may be thrown back out of engagement when it becomes necessary to lower the template-holder in the machine.

Now referring more particularly to the charging mechanism: A magazine 80 is provided which is long enough to contain the skewers 81 and wide enough to extend completely across the face of the template when the latter is in upright position in the machine. While this magazine may be supported in various ways it is here shown to be mounted upon a table 83, fastened to cross bars 85, as best shown in Figure 4. The ends of these bars project into grooves formed in the inner edges of longitudinal bars 86. The latter are fastened to cross bars 88, which in turn are supported upon and fastened to the horizontal frame members 74, previously mentioned. Thus it will be evident that the table 85 is slidable in the bars 86 as guides. These guides are open at the rear end and hence the table may be entirely withdrawn from the machine for repairs, or other purposes. Ordinarily, during the operation of the machine the table will not be moved.

Dividers 84 are provided at the bottom of the charger as best shown in Figures 4 and 5. These are so spaced as to receive but a single skewer between them, and to hold the skewers at a proper distance apart to enter guide channels 90 which rest upon the forward end of the table, and receive the skewers from the magazine when the skewers are pushed forward in the manner which will be explained. Extending across the front of the table is a stationary guide block 92 having a series of horizontal channels 93 which register with the channels 90, and with the apertures 5 in the cross bars 4.

Extending horizontally crosswise of the machine back of the magazine is a plunger bar 96, to which are fastened a set of push rods or plungers 98 equal in number to the channels 90 and 93 and apertures 5. These plungers are guided by an apertured guide block 100 at the back of the magazine, and when pushed forward transfer a set of skewers from the magazine and thru the channels 90 and 93 into the apertures 5. Bar 96 is provided with a pair of handles 102, by which it may be reciprocated forward and backward for thus delivering the skewers. The bar is guided by clips 104 which engage the edges of the table 83 as best shown in Figure 5.

In operation, an empty template is first brought to the machine, and secured in place in the template-holder by passing the pins 21 into the notches of the brackets 20, and placing the lugs 26 in engagement with the lower cross bar 18. The locking bar 30 is then lowered so as to lock the template in place. This act of applying the template is usually performed while the template holder is in the elevated position shown in Figure 8. The ratchets 48 are thrown back out of engagement with the teeth of the ratchet bars 16, and then the operator rotates the rockshaft 71 in a direction to throw back the pawls 70. The template and template-holder are now free to be lowered, which the operator does by pressing down on the holder until the highest one of the skewer holders or cross bars 4 is on a level with the bottom of the channels 93. When the template has descended to lowermost position the operator restores the ratchets 48 and pawls 70 to acting position. In the meantime a supply of skewers has been introduced into the magazine 80, and these semi-automatically distribute themselves in the spaces between the dividers 84. The plungers 98, which normally lie in the retracted position shown in Figure 4, are now pushed forward, causing the lowermost skewer in each of the divisions of the magazine to move forward, first along the channels 90 and then along the channels 93, and finally into the apertures 5 in the cross bars 4 of the template. The movement is continued until the forward end of the skewers reaches the back plate 7 of the template. The operator then retracts the plungers, and returns them to the normal position thus permitting the pile of skewers in the magazine to descend and place a fresh skewer in front of each plunger. Before again moving the plungers forward, the operator presses down on the foot bar 65, thus causing the bars 45 and pawls 48 to rise sufficiently to bring the next cross bar 4 to the level of the channels 90, 93. As soon as the template has thus been raised, the pawls 70 take hold and prevent the descent of the template, thus permitting the operator to release the foot bar 65 and cause the reciprocating ratchet carrying bars 45 to descend to their normal lowered position shown in Figure 1. The machine is now ready to have the plungers again moved forward to deliver a set of skewers into the second crossbar. The operation is then repeated until the crossbars 4 have all been filled, and the template holder has risen to its highest position. The locking bar 30 is then thrown back which permits the operator to remove the template which is now completely charged with skewers. The filled template is then brought to horizontal position as shown in dotted line in Figure 1, after which it may be taken away to the moulds.

From the foregoing description and an examination of the drawings, which form part of this specification, it will be evident that the template may be charged very rapidly. According to the present design eighteen skewers are inserted simultaneously. The template is advanced upward by a single manipulation of the foot lever, and the skewers are advanced by merely moving the push bar 96. These operations are so simple that a template containing several hundred apertures can be filled very quickly, and usually one or two attendants are employed for removing the filled templates, and replacing empty ones, in addition to the operator who manipulates the foot bar and push bar. It will also be noted that it is not necessary to move the magazine itself with its contained weight of skewers. The skewers are advanced by moving merely the pusher bar and the push rods or plungers, which are comparatively light in weight.

Among some of the detailed characteristics of the machine: It will be observed that the channels 90 and 93 are open at the top, so that the skewers may be lifted out of them when the template holder rises. It will also be observed that the guide channels are formed in two sections, the forward section 93 being stationary and the connecting section 90 being removable from the machine, but permanently attached to the magazine. This makes for certainty and smoothness of operation, especially as the receiving ends of the channels 93 are chamfered or flaring to make sure that the skewers will enter easily and correctly.

Having thus fully described my invention, what I claim is new and desire to secure by Letters Patent is:

1. In a machine of the class described, a template holder, a magazine for containing the skewers, guides leading from the magazine to the template, and means for simultaneously pushing a plurality of skewers from the magazine through the channels and into the template, the magazine being removable from the machine, and the guides being formed in two sections, one section being stationary in the machine and the other permanently connected to the magazine, and removable with it.

2. A template filling machine having a main frame, a template holder, means for guiding the holder in a vertical direction in the frame, the holder being adapted to hold the template in a vertical plane, manually operated ratchet and pawl mechanism for intermittently elevating the holder, a magazine for holding the skewers, and separate manually operated means for intermittently transferring a plurality of skewers from the magazine to the template, the ratchets and pawls being retractable, whereby they may be rendered non-active to permit the holder to be lowered preparatory to filling the template.

In witness whereof, I have hereunto subscribed my name.

HENRY A. WEIHMANN.